United States Patent

Van Overbeek et al.

[15] 3,647,957

[45] Mar. 7, 1972

[54] TRANSMISSION SYSTEM FOR THE TRANSMISSION OF CHARACTERS

[72] Inventors: Adrianus Johannes Wilhelmus Marie Van Overbeek; Leendert Gerardus Krul, both of Emmasingel, Eindhoven, Netherlands

[73] Assignee: U.S. Philips Corporation, New York, N.Y.

[22] Filed: Dec. 15, 1969

[21] Appl. No.: 885,114

[30] Foreign Application Priority Data

Dec. 24, 1968 Netherlands..........................6818585

[52] U.S. Cl...........................................178/6.8, 178/DIG. 3

[51] Int. Cl...........................................................H04n 7/12

[58] Field of Search....................178/DIG. 3, 6.8; 340/324 A

[56] References Cited

UNITED STATES PATENTS 2,102,139 12/1937 Vance...............................178/DIG. 3

2,241,544 5/1941 Dreyer, Jr...............................178/6.8

*Primary Examiner*—Robert L. Griffin
*Assistant Examiner*—Richard K. Eckert, Jr.
*Attorney*—Frank R. Trifari

[57] ABSTRACT

A transmission system for transmitting characters which are picked up by a television camera. The video signal produced is converted into a pulsatory signal each pulse of which determines a black-to-white transition which signal is subsequently applied to a digital-to-analog converter which provides a signal varying in amplitude and comprising several samples which signal is transmitted together with field synchronizing signals through a transmission path to the receiver circuit. In the receiver circuit the signal varying in amplitude, together with the field synchronizing signals is applied directly or through a memory to a display device including a cathode-ray tube having two pairs of deflection means for deflecting an electron beam generated in the tube into two directions which are transverse to each other, a sawtooth signal of field frequency generated under the control of said field signals being applied as a time base to a first pair of deflection means and the signal varying in amplitude being applied to the second pair of deflection means.

10 Claims, 12 Drawing Figures

Figure 1:
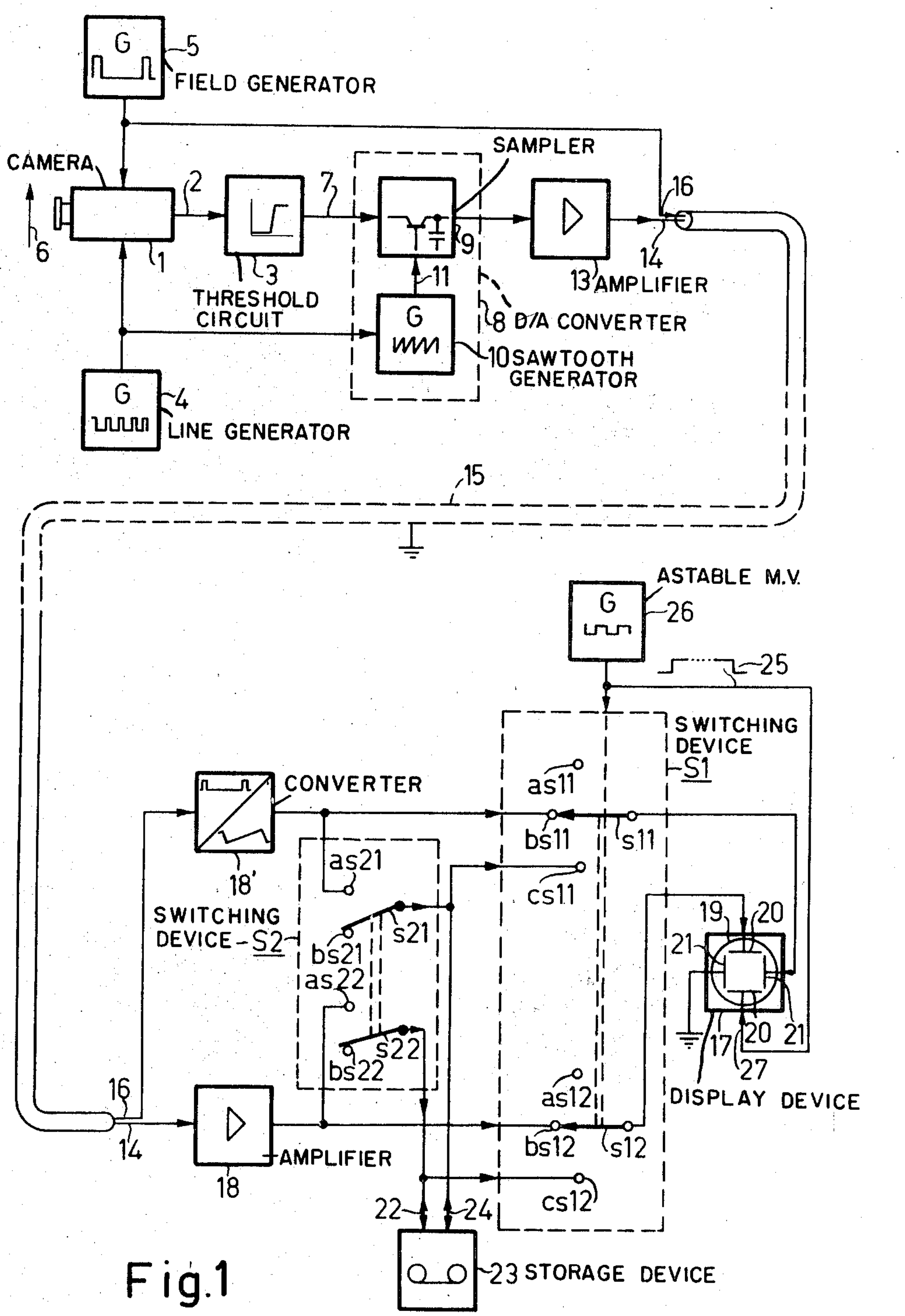

INVENTORS
ADRIANUS J.W.M. VAN OVERBEEK
LEENDERT G. KRUL
BY
Frank R. Trifari
AGENT

INVENTORS
ADRIANUS J.W.M. VAN OVERBEEK
LEENDERT G. KRUL
BY
AGENT

INVENTORS
ADRIANUS J.W.M VAN OVERBEEK
LEENDERT G. KRUL
BY
Frank R. Trifari
AGENT INVENTORS
ADRIANUS J. W. M. VAN OVERBEEK
LEENDERT G. KRUL
BY
[signature]
AGENT

INVENTORS
ADRIANUS J.W.M. VAN OVERBEEK
LEENDERT G. KRUL
BY

AGENT

INVENTORS
ADRIANUS J.W.M. VAN OVERBEEK
LEENDERT G. KRUL
BY
[signature]
AGENT

INVENTORS
ADRIANUS J.W.M. VAN OVERBEEK
LEENDERT G. KRUL
BY
AGENT

INVENTORS
ADRIANUS J.W.M. VAN OVERBEEK
LEENDERT G. KRUL
BY
[signature]
AGENT

INVENTORS
ADRIANUS J.W.M. VAN OVERBEEK
LEENDERT G. KRUL
BY
AGENT

INVENTORS
ADRAINUS J.W.M. VAN OVERBEEK
LEENDERT G. KRUL
BY
AGENT

TRANSMISSION SYSTEM FOR THE TRANSMISSION OF CHARACTERS

The invention relates to a transmission system for the transmission of characters comprising a pickup circuit having a television camera provided with a line generator and a field generator. The camera converts the character into video signals line-by-line and field by field under the control of signals originating from said line and field generators. The video signals are applied to a threshold circuit for converting the video signal into a pulsatory signal determining the so-called black-to-white transitions from the original video signals. The threshold circuit is coupled to a digital-to-analog converter for converting the pulsatory signal sample by sample into an amplitude-varying signal for transmission through a transmission path to a receiver circuit, and to a pickup and a receiver circuit for the system.

U.S. Pat. No. 2,738,499 describes a method of identifying characters, particularly numerical characters. The pulsatory signal derived from the television camera is applied to a digital-to-analog converter employing a sawtooth generator and a sampler circuit connected thereto. The pulsatory signal is supplied to the sampler circuit so that during the occurrence of the pulses over one line scan period, samples are supplied in the said pulsatory signal. The magnitude of said samples is dependent on the instantaneous value of the sawtooth signal.

It has been stated that two digital-to-analog converters are used which employ sawtooth generators providing a sawtooth signal in phase opposition. As a result a pulse applied to the sampler circuits and having different amplitudes occurs in the two amplitude-modulated pulsatory signals provided, which difference is dependent on the duration up to the middle of the scan period of the sawtooth. Subsequently, the greatest pulse value for one scan period is determined in both signals by means of peak rectifier circuits. The resultant voltages thus each represent an envelope of the character located on either side. Arrangement of the character and its envelope in regions and differentiation of the obtained voltages representing the characteristic envelopes lead to the conclusion, by means of mutual comparison of, which character has been picked up by the television camera.

It is found that the proposed method may be used for the identification of given characters, characteristic data of which are laid down. The characteristic data have been given for the FIGS. 0–9. It can be noted that the identification of letters is not dealt with, let alone the identification of signatures and words or text.

An object of the invention is to provide a system for the identification of characters in which the identification in itself is not effected through fixed characteristic data, but through the transmission of an image of the characters. For this purpose a transmission system is required through which the characters such as signatures (banks) or other manually written texts, for example, the address written on the envelope of a letter (post-office) can be transmitted in a simple manner and displayed on a simple display device for the purpose of identification and checking.

Another object of the invention is to design a system such that the required equipment, both at the pickup end and at the receiver end becomes as simple as possible. To this end the transmission system according to the invention is characterized in that the signal varying in amplitude and consisting of various samples is transmitted together with field synchronizing signals originating from the field generator through the transmission path to the receiver circuit. The signal varying in amplitude, together with the field signals is applied in this receiver circuit directly or through a memory to a display device including a cathode-ray tube having two pairs of deflection means for deflecting an electron beam generated in the tube into two directions which are transverse to each other. A sawtooth signal of field frequency generated under the control of said field signals is applied as a time base to a first pair of deflection means, and the signal varying in amplitude is applied to the second pair of deflection means.

The invention is based on the recognition of the fact that due to the transmission of signal supplied by the television camera and converted in the manner described above, together with the field synchronizing signals, a very simple character display is possible with the aid of an oscilloscope by causing the field synchronizing signals to by synchronized with the time base of the oscilloscope. Thus the system is based on television oscillography.

Another object of the invention is to make the required bandwidth of the transmission path as small as possible. In fact, in many cases the transmission takes place through cables which lead from a counter in a bank, where the signature is submitted, to the chief administration department which is either or not in the same building and where the signature must be verified and where it is also checked whether the client's balance account is sufficient to pay out the amount to be withdrawn which can be orally passed on. For example, through a telephone line.

These cables must therefore be simple and consequently their bandwidth must be maintained as small as possible.

This can be achieved in a very simple manner with the system according to the invention by transmitting not all samples occurring during one line period at the same time, but during a first field period the first black-to-white transitions of each line, during a second field the second black-to-white transitions of each line, etc., etc., up to and including the $n^{th}$ field during which the $n^{th}$ black-to-white transitions of each line are transmitted.

In order to achieve this a further embodiment of the transmission system according to the invention is characterized in that a transition counter and a gating circuit are provided at the pickup end between the output of the threshold circuit and the input of the digital-to-analog converter. The transition counter has a first input which is connected to the output of the threshold circuit and a second input to which signals originating from the line generator are applied and $n$ outputs. Pulses occurring at a first of these $n$ outputs exclusively as a function of the first black-to-white transition of each line, pulses occurring at the second $n$ output exclusively as a function of the second black-to-white transition of each line, etc., etc., and pulses occurring at the $n^{th}$ output exclusively as a function of the $n^{th}$ black-to-white transition of each line. A feedback is provided in the counter as from the $n^{th}$ output so as to cause the counter to stop when counting the $(n+1)^{th}$ transition of each line. The gating circuit has at least 2 $n$ inputs, a first pair of $n$ inputs of which is connected to the $n$ outputs of the transition counter and a second pair of $n$ inputs of which is connected to $n$ outputs of a field counter to whose input field signals originating from the field generator are applied. The field counter applies pulses to a first of its $n$ outputs for a first field period, pulses to a second output for a second field period, etc., etc., and pulses to the $n^{th}$ output for an $n^{th}$ field period. The $n$ field pulses releases the gating circuit through the second pair of $n$ inputs in such a manner that the pulses occur at its output during a first field period exclusively as a function of the first black-to-white transitions of each line, the pulses occur during the second black-to-white transitions of each line, etc., etc., and the pulses occur during the $n^{th}$ field period exclusively as a function of the $n^{th}$ black-to-white transition of each line.

Figure 2:
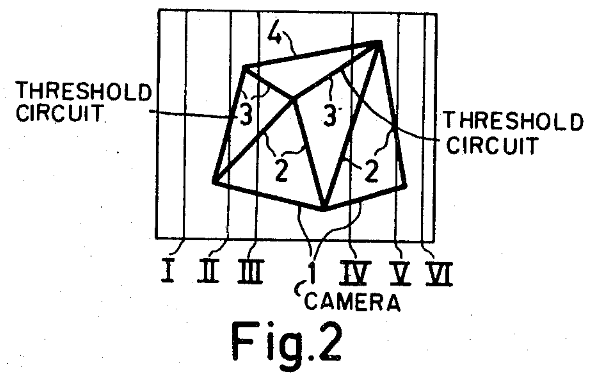
Figure 3:
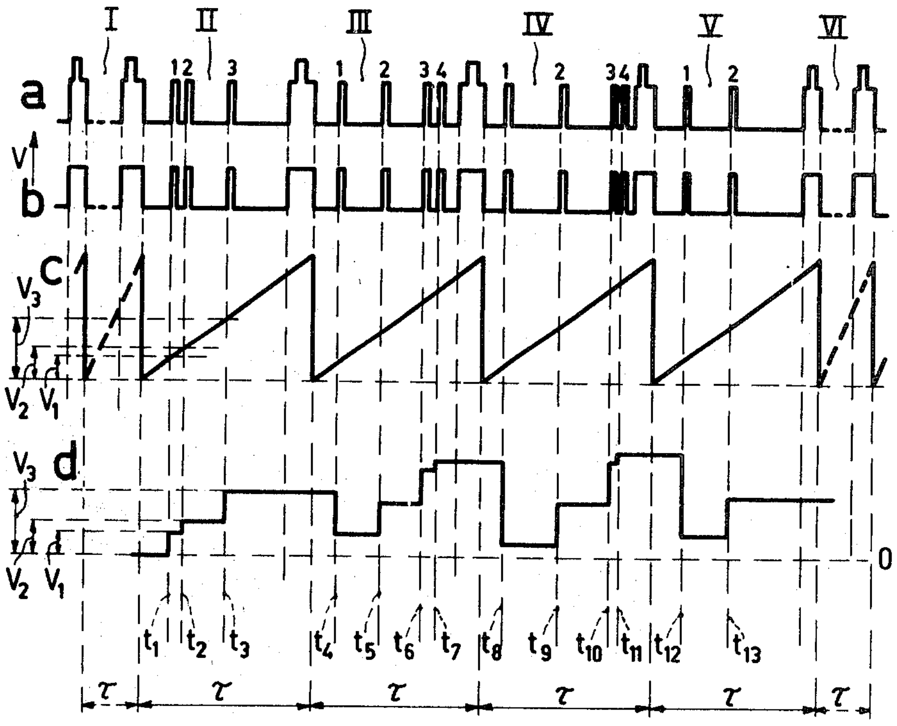
Figure 4:
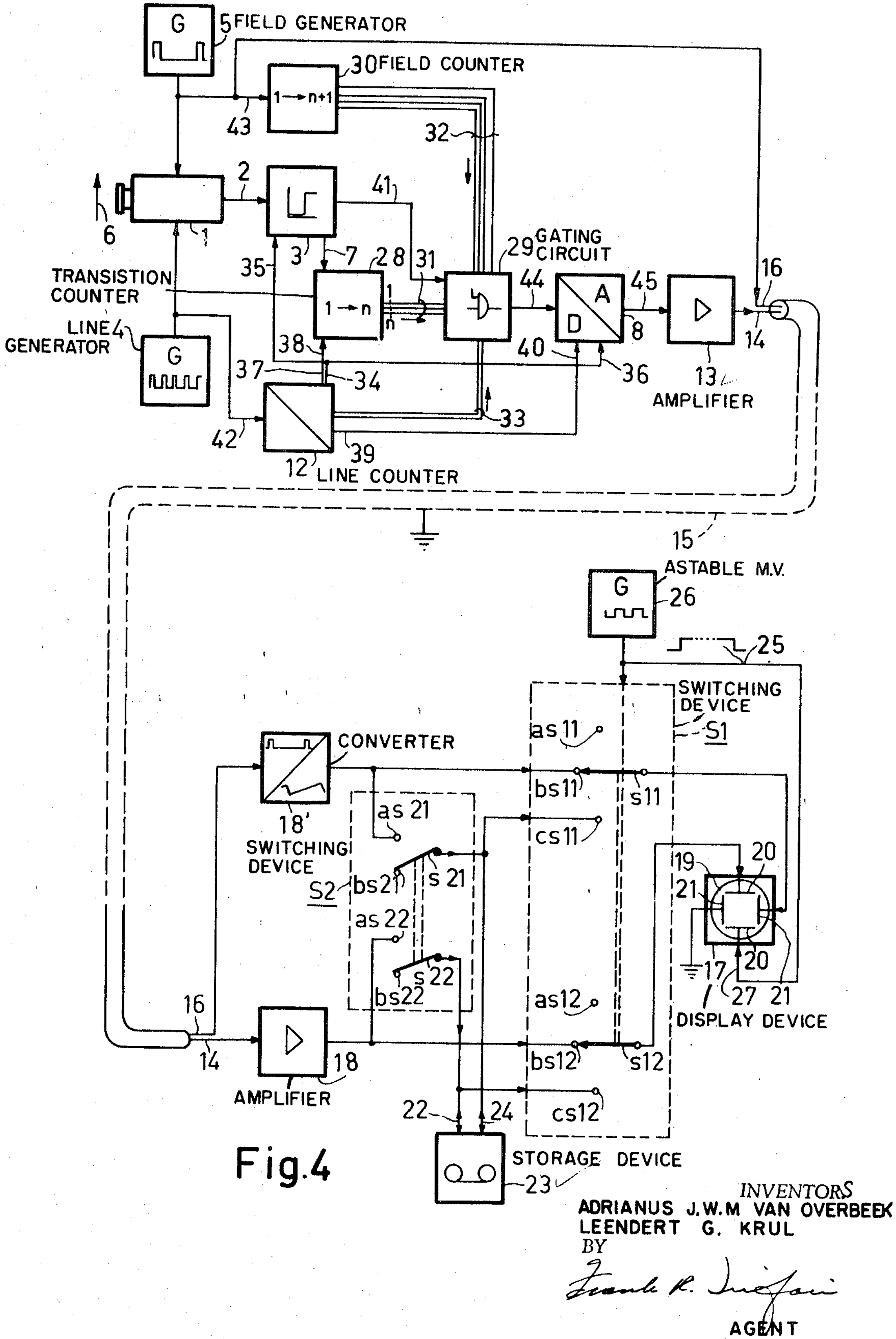
Figure 5:
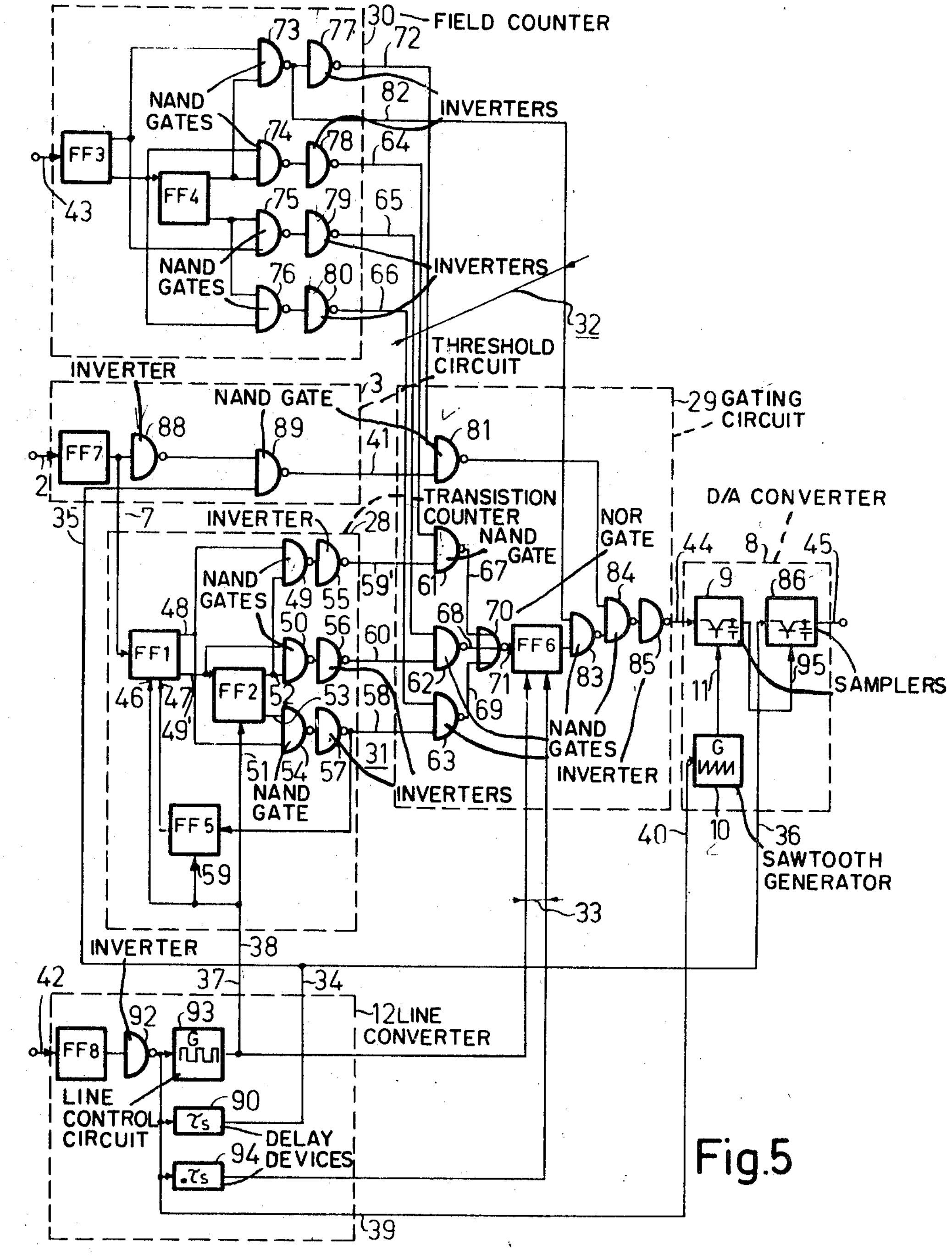
Figure 6:
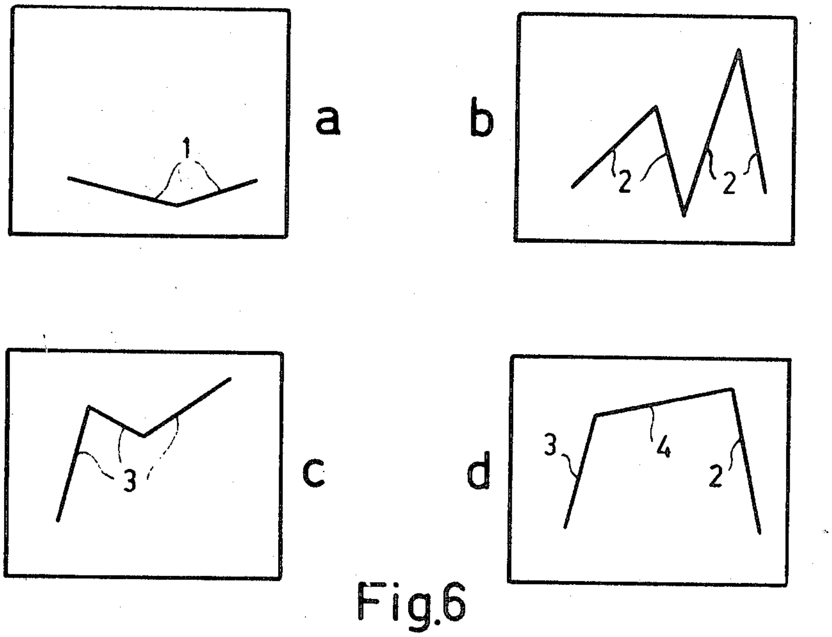

In order that the invention may be readily carried into effect, a few embodiments thereof will now be described in detail by way of example with reference to the accompanying diagrammatic drawings, in which:

FIG. 1 shows a first embodiment of a transmission system according to the invention in its simplest form, FIG. 2 is an example of a character as can be transmitted with the aid of this system, FIG. 3 shows signal waveforms as a function of time as these will occur when transmitting a character according to FIG. 2 in the system according to FIG. 1, FIG. 4 shows a second embodiment to which a transition counter, field counter and gating circuit are added, FIG. 5 is a detailed circuit of various parts as are used in the embodiment of FIG. 4, FIG. 6 shows the various pictures as they are displayed during successive field periods with the aid of the system according to FIG. 4 on the screen of a cathode-ray tube at the receiver end, when a character according to FIG. 2 is transmitted.

Figure 7:
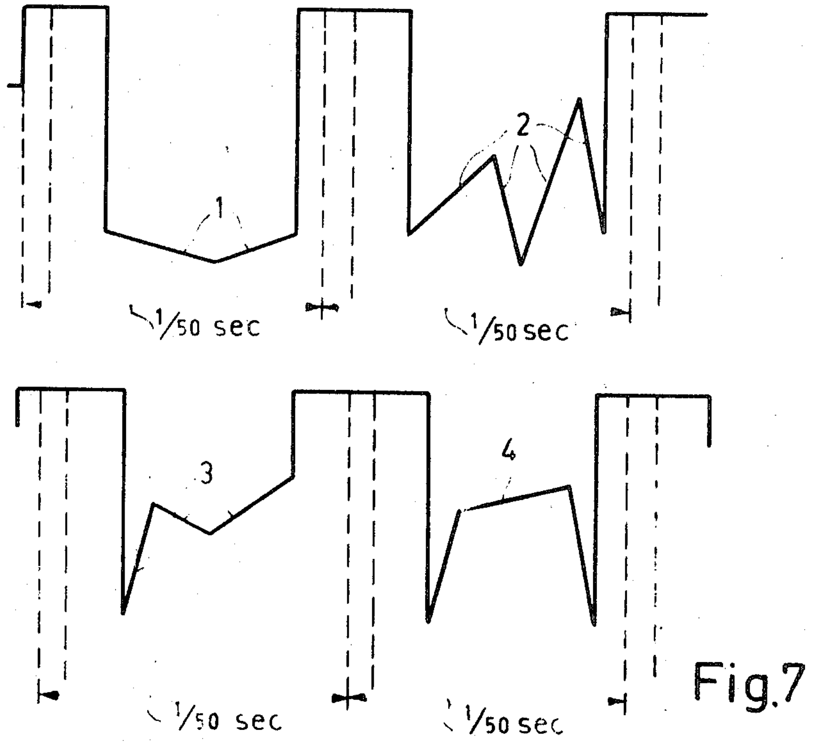
Figure 8:
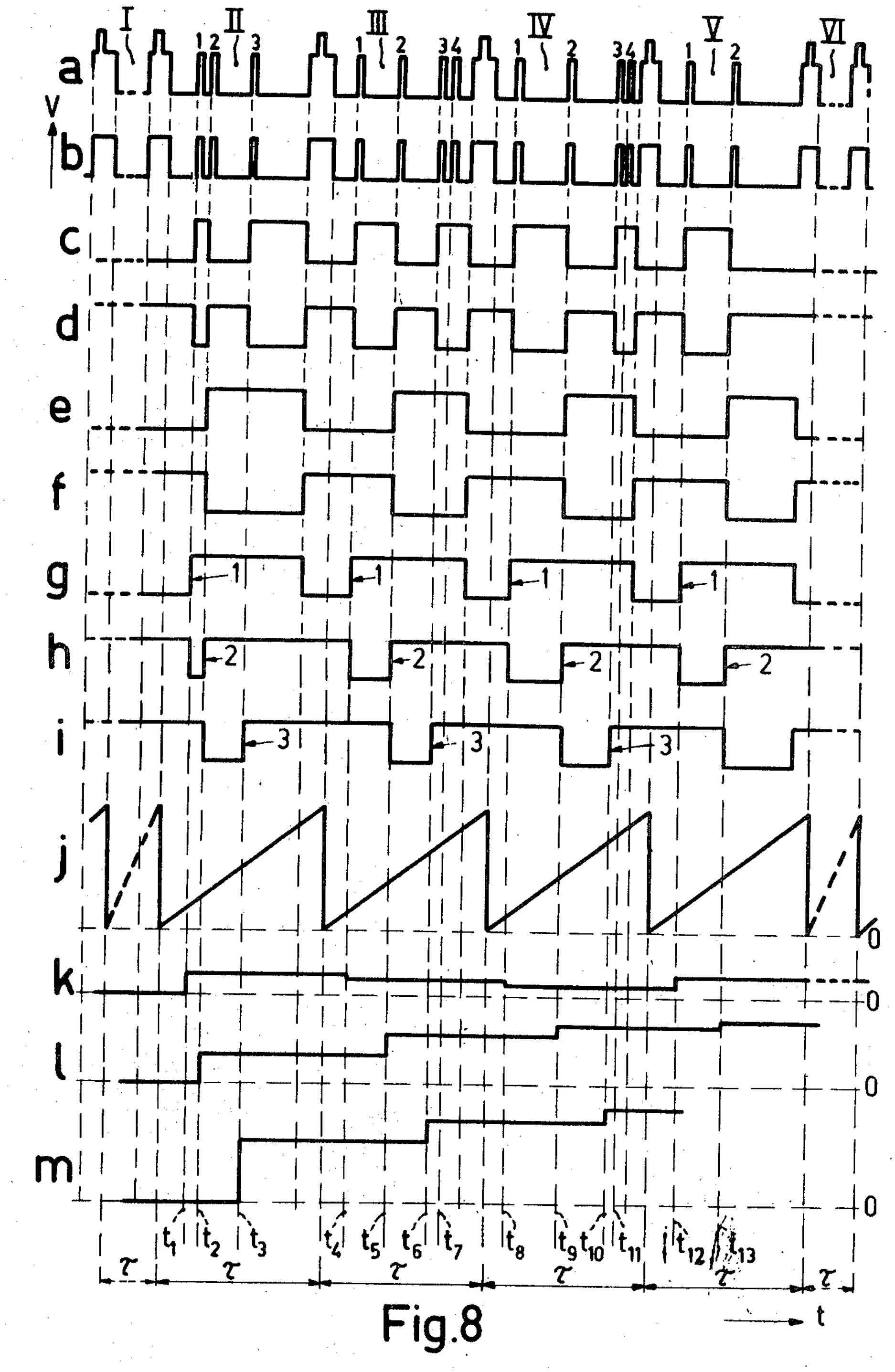
Figure 9:
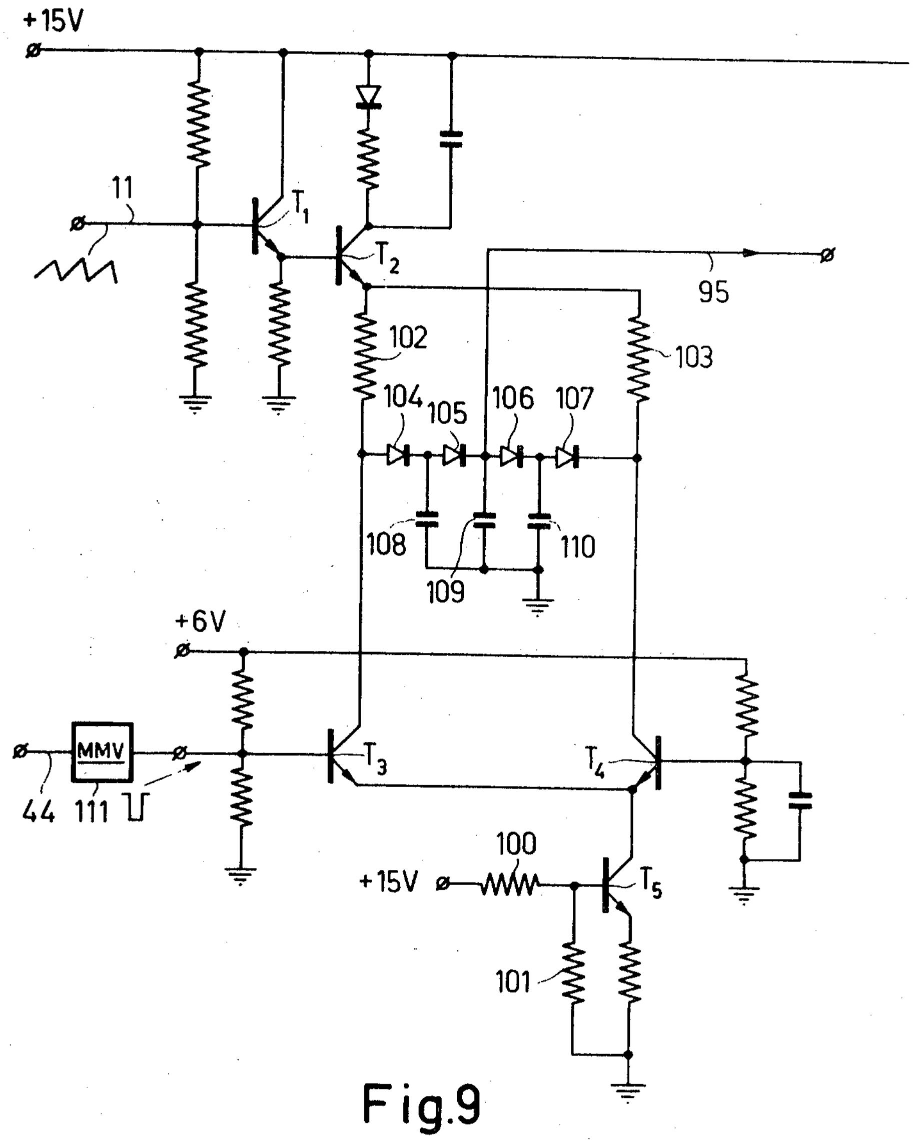
Figure 10:
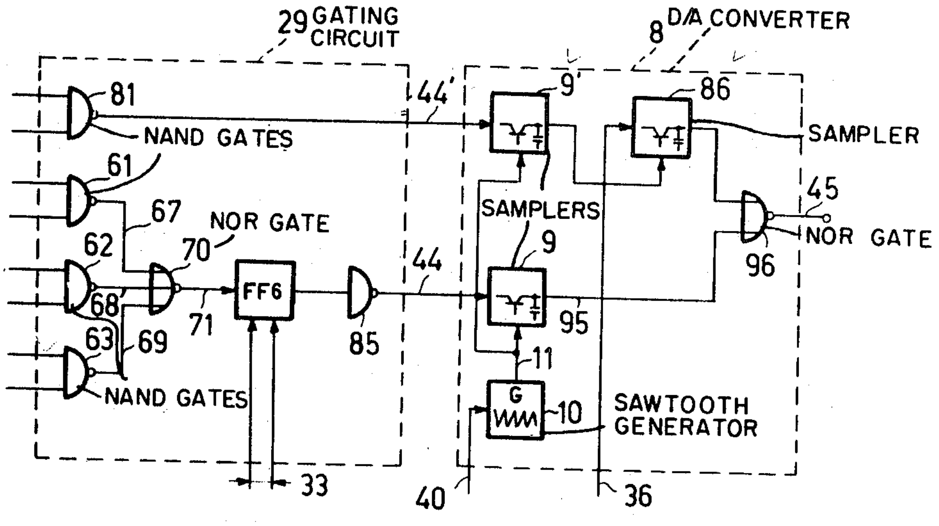
Figure 11:
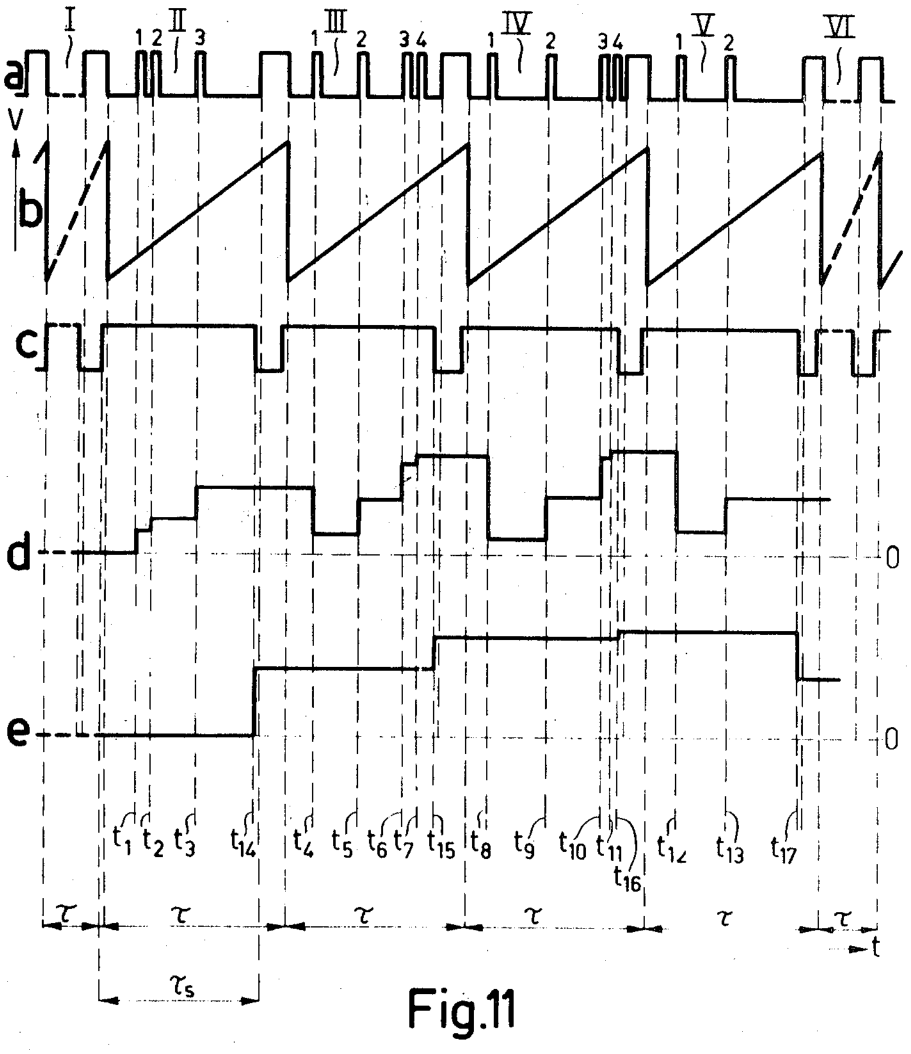
Figure 12:
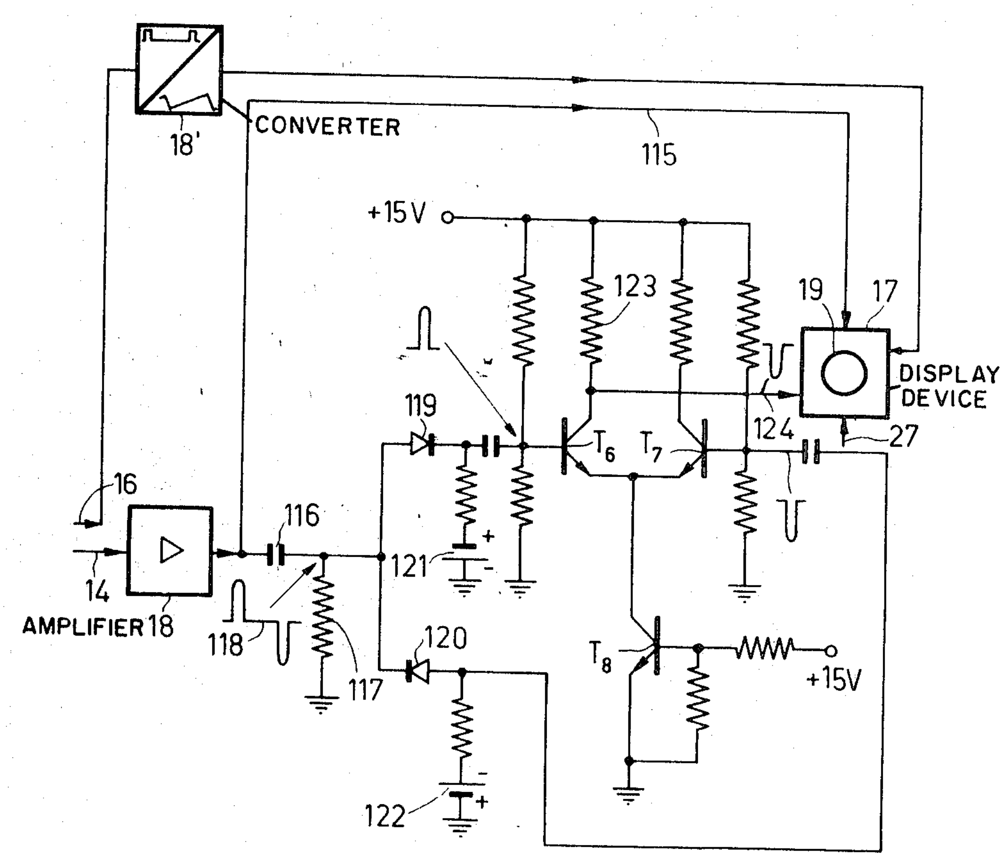

FIG. 7 shows the various signals associated with the pictures of FIG. 6, as they are transmitted during successive field periods with the aid of the system of FIG. 4, FIG. 8 shows signal waveforms as a function of time as they may occur when transmitting the character of FIG. 2 in the system of FIG. 4, FIG. 9 is a detailed embodiment of a sampler circuit as may be used in the system of FIG. 1 and FIG. 4, FIG. 10 shows a detailed circuit which is slightly modified relative to FIG. 5, FIG. 11 shows signal waveforms as a function of time when transmitting the last black-to-white transition of a character of FIG. 2, and FIG. 12 shows a circuit for suppressing the electron beam in a display device of FIG. 4 when the signal to be displayed includes steps having too great a slope.

In FIG. 1, the reference numeral 1 denotes a television camera whose output 2 supplies a video signal which is applied to threshold circuit 3. The camera picks up an object 6 under the control of signals originating from a line generator 4 and a field generator 5. The object 6, which for convenience' sake is represented as an arrow in FIG. 1, may be a white sheet of paper provided with a signature or another character, the intention being to transmit the signature written on the sheet of paper or another character provided thereon.

As will further be described with reference to FIG. 3, the video signal originating from the output 2 is converted in the threshold circuit 3 into a purely pulsatory signal. In other words, the signal at an output 7 of threshold circuit 3 exclusively contains information regarding black-to-white transistions because it is either minimum (for example, black value) or maximum (for example, white value). However, for reading characters this is sufficient information since one works, for example, with black lines (for example, fountain-pen ink) on a white background (white paper). Grey values are therefore not included in the consideration.

The signal derived from the output 7 is applied to a digital-to-analog converter 8 comprising a sampler circuit 9 and a sawtooth generator 10. The sampler circuit 9, a possible detailed embodiment of which is shown in FIG. 9, takes samples during each line period at the instants when a black-to-white transition occurs in the signal derived from the output 7. The magnitude of the sample depends on the instantaneous value which the sawtooth signal of line frequency has at said instants, which signal is applied through a lead 11 of the generator 10 to the sampler circuit 9. This sawtooth signal of line frequency is in synchronism with the line frequency scanning in the camera 1, since the line-synchronizing pulses derived from the line generator 4 are not only applied to camera 1, but also synchronize the sawtooth generator 10.

In most cameras the line generator 4 is incorporated in the camera and it is only possible to derive line pulses from the camera. It is then compulsory to use a solution as shown in FIG. 1. If, however, a sawtooth signal of line frequency could be derived from the generator 4, then this signal could be applied directly from generator 4 to the lead 11.

By taking samples a signal varying in amplitude is produced at the output of the sampler circuit 9 which signal is applied after amplification in an amplifier 13 to a first wire 14 of a cable 15 functioning as a transmission path the grounded outer sleeve of which cable is used, for example, as a return line.

The field synchronizing pulses derived from the field generator 5 are also transmitted through a second wire 16 of the cable 15 to the receiver end because, as will be described hereinafter, the time-base control in a display device 17 takes place at field frequency. However, when there is no twin-cable available, it is alternatively possible to superimpose the field signal on the amplitude-varying signal which is derived from the amplifier 13, and to transmit the overall signal through a single wire and subsequently to separate them at the receiver end. A very appropriate method is to modulate one or both signals on a carrier, for example, in accordance with the frequency-modulation method. If, for example, the field signal is taken for this purpose, which signal has a repetition frequency of only 50 or 60 Hz., then this signal can be modulated on a carrier whose frequency lies above the frequency spectrum of the amplitude-varying signal (which is then not modulated).

The signal transmitted by the wire 14 is amplified in an amplifier 18 and is subsequently applied through a switch s12 to an input of the display device 17. Switch s12 forms part of a switching device S1 which is preferably designed electronically, for example, with the aid of switching diodes and which will further be referred to hereinafter. In FIG. 1 the switch s12 is shown in such a manner that it is connected to a contact bs12 which is the position for direct display of the signal originating from the wire 14 by the display device 17.

The field signal from the wire 16 is applied through a switch s11, which likewise is associated with the switching device S1, to the display device 17 and provides, for example, through a converter 18' a sawtooth signal of field frequency which as a time base must ensure the horizontal deflection in the display device 17. Switch *s*11 is likewise shown in the direct display position and is therefore connected to a contact *bs*11. If the signal originating from the wire 16 is too weak, it may be amplified for example, in converter 18' likewise as the signal derived from the wire 14.

A cathode-ray tube 19 is shown in greater detail in the display device 17. A pair of vertical deflection plates 20 and a pair of horizontal deflection plates 21 are shown. The signal derived in amplified form from the wire 14 is applied to one of the plates 20. The sawtooth signal of field frequency from converter 18' is applied as a time base to one of the plates 21, which signal is synchronized by means of the field signals derived from the wire 16, the other plate is connected, for example, to ground.

Although deflection with the aid of plates, particularly as regards vertical deflection, is the simplest form, it is alternatively possible to use coils for this deflection. This is no problem for the horizontal deflect on taking place at field frequency, since this is known from the television technique. As regards the vertical deflection it is, however, important to convert the steps which occur in the amplitude-varying signal at the output of the amplifier 18 with sufficient reliability into a current which must flow through the vertical deflection coils. This can, however, easily be achieved by means of sufficiently great amplifications and properly proportioned coils.

To explain the operation of the system of FIG. 1, it will now be described how, for example, a drawing as shown in FIG. 2, can be transmitted. A drawing has been taken as an Example in FIG. 2 because the transmission process can clearly be described with the aid thereof. The scanning principle is such that the line scanning takes place in a vertical direction and the field scanning takes place in a horizontal direction. The video signal thus obtained at the output 2 is converted into an amplitude-varying signal which becomes ultimately active at the pair of vertical deflection plates 20 of the tube 19 at whose horizontal deflection plates 21 a sawtooth signal of field frequency is active as a time base. As is common practice in oscilloscopes, the electron beam then writes the picture to be displayed on the screen so that the characters are displayed at the receiver end by means of very simple equipment. It will be evident that horizontal and vertical direction may be interchanged both at the pickup and receiver ends without changing the principle of the invention thereby.

FIG. 2 shows only a few lines I, II, III, IV, V and VI of the total of 625 lines which is used for a complete picture (two fields). In the Example chosen the method used is namely an interlaced 625-line system per picture at a field frequency of 50 Hz. which is common practice in television. The duration of one line is then approximately 64μsec. and the duration of one field is 1/50 sec = 20 m.sec. The interlaced condition of the system is not used for the description, since only a few lines are considered. It will, however, be evident that a larger or smaller number may be used instead of 625 lines, so that also the horizontal frequency is varied. If desired, a different field frequency, for example, 60 Hz. may alternatively be chosen.

Each of the line II to V inclusive passes during scanning successively the drawn lines 1 to 4 inclusive of the drawing of FIG. 2. Thus, the line II will pass the drawn line 1 at an instant $t_1$ during scanning (see also FIG. 3), the drawn line 2 at the instant $t_2$ and the drawn line 3 at the instant $t_3$. During scanning of the line III the instants $t_4$, $t_5$, $t_6$ and $t_7$ apply for passing the drawn lines 1, 2, 3 and 4, respectively, during scanning of the line IV the instants $t_8$, $t_9$, $t_{10}$ and $t_{11}$ apply, and finally for the line V the instants $t_{12}$ and $t_{13}$ apply because then only the drawn lines 1 and 2 are passed.

In the Example of FIG. 2 a maximum of only 4 drawn lines, namely 1 to 4 inclusive has been taken, but it will be evident that more points of passage will occur when there are more lines in a drawing.

A video signal as shown in FIG. 3*a* is produced at the output 2 of the camera 1, during which no black-to-white transitions occur upon scanning of the lines 1 and VI but which transitions do occur in the lines II to V inclusive where these transitions are shown as pulses accompanied by the numerals 1, 2, 3 and 4 so as to indicate which pulse is associated with a drawn line of FIG. 2. In FIG. 3*a* it has also been assumed that the drawn lines 1 to 4 inclusive are purely black lines written on a white background. If this is not the case, the pulses 1 to 4 inclusive FIG. 3*a* will not proceed from white level to black level, but they will be smaller in amplitude. Since the signal prevailing at the output 2 is converted in the threshold circuit 3 into a purely pulsatory signal as is shown in FIG. 3*b*, it does not matter whether the pulses 1 to 4 inclusive of FIG. 3*a* reach or do not reach the black-white level because the maximum value is achieved anyway after conversion in threshold circuit 3. The threshold circuit 3 may be, for example, a bistable multivibrator which reacts to both the leading edge and to the trailing edge of a pulse.

The signal according to FIG. 3*b* prevailing at the output 7 is subsequently applied to the sampler circuit 9 which receives likewise from generator 10 a sawtooth signal of line frequency according to FIg. 3*c*. As is also apparent from FIG. 9, the sampler circuit 9 is formed in such a manner that a sample is taken every time at the instants $t_1$ to $t_{13}$ inclusive; the value of said samples depending on the value of the sawtooth of FIG. 3*c* at the relevant instant. Thus, for example, the output signal of the circuit 9 which is shown in FIG. 3*d* at the instant $t_1$ will assume the value $V_1$, the value $V_2$ at the instant $t_2$ and the value $V_3$ at the instant $t_3$, which values are the same as those in the sawtooth signal according to FIG. 3*c* at the these instants. The same of course happens in the signal according to FIG. 3*d* when scanning the lines III, IV and V so that ultimately a signal varying in amplitude becomes available. After amplification the signal can be applied to a vertical plate 20. During the line period $\tau$ which is approximately 64μsec. and during which the line II is scanned at the pickup end, the electron beam in the cathode-ray tube 19 is shifted only very slightly in the horizontal direction under the influence of the sawtooth of field frequency which is active at the plates 21. The electron beam can thus be displaced in a vertical direction during the time $\tau$ under the control, of the steps in the signal according to FIG. 3*d* and then remains for a given period in the position determined by each step. Thus the electron beam is shifted at the instant $t_1$ from the initial position under the influence of the value $V_1$ to a first position which corresponds to the point on the drawn line 1 during scanning of the line II at the pickup end (point of intersection of lines 1 and II). The electron beam remains there for the period $t_1 \rightarrow t_2$ which becomes visible as a white dot on the screen of the tube 19. Subsequently at the instant $t_2$ the electron beam moves to a position under the influence of the value $V_2$ which position corresponds to a point on the line 2 in FIG. 2, during scanning of the line II. The electron beam remains there for the period $t_2 \rightarrow t_3$ and subsequently moves at the instant $t_3$ under the influence of the value $V_3$ towards a position which is determined by a point on the line 3 FIG. 2 during scanning of the line II.

Since FIG. 2, and hence FIG. 3 show only a few scanning lines (shown uninterruptedly in FIG. 3, but as will be evident large time differences lie between the scanning periods of the lines I to VI inclusive) but these lines will amount to a large number in practice, namely 625, it is achieved that the electron beam is moved in steps at the receiver end and subsequently remains in the same position for a given time after such a step so that it writes white lines on the screen of the tube 19, which lines correspond to the black lines of the character at the pickup end.

To achieve all this it is necessary for the sampler circuit 9 to include a capacitor functioning as a memory, which capacitor is charged very quickly to an instantaneous value determined by the sawtooth signal according to FIG. 3*c*, when the black-to-white transition occurs.

This method is the simplest, since no brightness control of the electron beam tube 19 is necessary for the signal according to FIG. 3*d*, because the electron beam which is present at its maximum value during the quick steps at the instants $t_1$ to $t_{13}$ inclusive will not be able to substantially excite the phosphor on the screen of the tube 19 so that this phosphor will not substantially luminesce or will not luminesce at all.

In principle, it is, however, alternatively possible to work without a memory so that then the output signal of sampler circuit 9 becomes a pulsatory signal having a varying amplitude. However, it is then compulsory not only to apply the occurring pulses in this sampler signal at the receiver end to the deflection plates 20, but also after limitation to the Wehnelt cylinder of the tube 19 so as to release the electron beam during the occurrence of these pulses. In addition the luminescence is less not because the period of the electron beam being able to excite the phosphor has become shorter. Therefore the use of a memory in the sampler circuit 9 is preferred.

A very simple system has been attained, employing a television pickup circuit and an oscillographic display device; thus the system is based on television oscillography.

In the foregoing it has been assumed that the switches s11 and s12 were connected to the contacts *bs*11 and *bs*12 for direct display of the signal according to FIG. 3*d* in the display device 17. It is, however, possible to connect the switches *s*11 and *s*12 to a few blind contacts *as*11 and *as*12 so as to disconnect the display device 17. By switching a few switches *s*21 and *s*22 forming a switching device S2 from blind contacts *bs*21 and *bs*22 to contacts *as*21 and *as*22, respectively, the signal varying in amplitude can be applied to an input 22 of a storage device 23 and the field signal from the wire 16 can be applied, either through or not through converter 18', to an input 24 of this storage device. The storage device 23 may be a tape recorder or it may be provided with magnetic discs. In the last-mentioned position of the switches *s*11, *s*12, *s*21 and *s*22 the signal of FIG. 3*d* and the field signals are then stored in a magnetic memory. A figure determining, for example, the signature of a given person may also be stored in the magnetic memory through an additional input (not shown). When at a later stage this person's signature must be compared with the signature stored in the storage device 23, the magnetic discs on which the signature is magnetically stored and the position on this disc can directly be traced through the figure. Upon playback the amplitude-varying signal of FIG. 3*d* and the field signals then appear at the input-output 22 and 24, respectively. The input-output 22 and 24 are connected to contacts *cs*12 and *cs* 11 respectively. By switching the switches *s*11 and *s*12 simultaneously from the contacts *bs*11 and *bs*12 to the contacts *cs*11 and *cs*12 and vice versa under the control of a partly shown square wave signal 25 originating from an astable multivibrator 26, the signal from the camera 1 becomes directly available for the display device 17 on the one hand and the signal originating from the storage device 23 becomes available on the other hand. Simultaneously, the signal 25 is also applied to an input 27 of display device 17 so as to be active as a switching voltage at the deflection plates 20. Thus, the signal directly originating from the camera 1 will be written on the upper side of the screen of the tube 19 and the signal originating from the device 23 will be written on the lower side. When the phosphor of the screen 19 persists for a sufficiently long period, and when, for example, the duration of each pulse of the signal 25 amounts to a few field periods, for example, 4 to 5 field periods, the upper side shows the one signature (just picked up) and the lower side shows the other signature (originating from the memory) and the two signatures may be compared. The connection between the $n$ outputs of the transition counter 28 and the $n$ inputs of the gating circuit are shown in FIG. 4 by a lead 31. The field counter 30 has $n+1$ outputs connected to other $n+1$ inputs of the gating circuit 29. The connection between said outputs of field counter 20 and inputs of the circuit 29 are shown in FIG. 4 by a lead 32.

Furthermore, a line converter 12 connected to the line generator 4 is shows a plurality of outputs of which lead to the gating circuit 29. The latter connections are shown in FIG. 4 by a lead 33. Finally an output 34 of the line converter 12 leads to an input 35 of the threshold circuit 3, which output 34 is also connected to an input 36 of the digital-to-analog converter 8. Also line pulses derived from an output 37 of converter 12 are applied to an input 38 of the transition counter 28. Finally, a delayed line pulse is derived from an output 39 of the line converter 12 and is applied to an input 40 of the converter 8.

Thus the principle of the invention makes it possible in a very simple manner to trace the signatures quickly and to reproduce them because the signature is available as a simple analogue signal.

The system of FIG. 1 has a drawback, namely the bandwidth of the transmission path must be rather large since the steps in the signal of FIG. 3*d* must be transmitted rather accurately.

In order to obtain a system in which the advantage at the receiver end are maintained completely and are even enhanced while the bandwidth of the transmission path is greatly reduced, the embodiment of FIG. 4 may be used in which as many as possible corresponding parts have the same reference numerals as those in FIG. 1.

In the embodiment of FIG. 4, a transition counter 28 and a gating circuit 29 are arranged between the output 7 of the threshold circuit 3 and the converter 8. FIG. 4 also includes a field counter 30 to which field synchronizing pulses derived from the field generator 5 are applied. The transition counter 28 has $n$ outputs connected to a pair of first $n$ inputs of the gating circuit 29.

A lead 41 conveys a video signal from the threshold circuit 3 to the gating circuit 29. The latter signal is exclusively intended to transmit the last black-to-white transition in a certain character.

In order to be able to explain the operation of the system according to FIG. 4, the following components of FIG. 4 are shown in detail in FIG. 5, to wit: the threshold circuit 3, the line converter 12, the transition counter 28, the gating circuit 29, the field counter 30 and the converter 8. The various connections as shown between the parts in FIG. 4 have also the same reference numerals in FIG. 5.

Furthermore it is still to be noted that the input terminals for applying line synchronizing pulses from the line generator 4 to the line converter 12 has the reference numeral 42, the input of the field counter 30 to which field synchronizing pulses are applied from the field generator 5 to the field counter 30 has the reference numeral 43, the connection between the gating circuit 29 and the converter 8 has the reference numeral 44 and the output terminal of the converter 8 has the reference numeral 45.

If FIG. 5 is considered, it is found that the video signal applied to the terminal 2 and shown in FIG. 3*a* and once more in FIG. 8*a* is converted in the threshold circuit 3 so that a signal according to FIG. 8*b* is produced at the output 7. This signal is applied to a so-called flip-flop circuit $FF_1$ which is of the so-called preconditioned type, which means that such a flip-flop circuit can only be brought from one state to the other when signals at other input terminals make this possible. Thus, line synchronizing pulses derived from the input terminal 38 are applied to the input terminal 46 of the flip-flop circuit $FF_1$; while pulses derived from a further flip-flop circuit $FF_5$ are applied to a further input terminal 47, which pulses are necessary for the preconditioning of $FF_1$ in a manner as will further be described. A first output 48 of the flip-flop circuit $FF_1$ is connected to a so-called NAND-circuit 49 to whose other input a signal derived from a second flip-flop circuit $FF_2$ is applied. The other output 49′ of the flip-flop circuit $FF_1$ leads to the input of the second flip-flop circuit $FF_2$, but it leads also to a first input of a second NAND-circuit 50. The signal at the output 49′ is inverted relative to the signal at the output 48. A further input 51 of the second flip-flop circuit $FF_2$ receives line synchronizing pulses likewise derived from the input 38, which pulses serve to maintain the flip-flop circuit $FF_2$ in a preconditioned state, so that only under given circumstances the signal derived from the terminal 49′ can trigger the flip-flop circuit $FF_2$ into a different state. A first output 52 of the flip-flop circuit $FF_2$ leads, as was stated, to an input of the first NAND-circuit 49 and also to an input of the second NAND-circuit 50. Finally FIG. 5 shows that a third NAND-circuit 54 is present in the transition counter 28, one input of this NAND circuit being connected to a second output 53 of the second flip-flop circuit $FF_2$, and the other input of this NAND circuit being connected to the first output 48 of the first flip-flop circuit $FF_1$. For the flip-flop circuit $FF_2$ there applies that the signal at its second output 53 is inverted relative to the signal at the output 52. The three NAND-circuits 49, 50 and 54 are succeeded by 3 inverter circuits 55, 56 and 57 and this is done so as to be able to work with existing circuit blocks. In fact, if AND circuits had been taken for 49, 50 and 54, the inverter circuits 55, 56 and 57 would have been superfluous.

In the case of the circuit arrangement according to FIG. 5 it is only desired to count the first three transitions, that is to say, the number $n$ as stated in the preamble is 3 in this case. If however, $n$ was to have been 4, then 2 flip-flop circuits and 4 AND circuits would have been necessary, or 4 NAND circuits and 4 inverter circuits would have been necessary if existing circuit blocks had been used.

If counting up to 5 transitions was to have taken place, then 3 flip-flop circuits and 5 And circuits (or 5 NAND circuits and 5 inverter circuits) had been necessary.

However if counting up to 9 was to have taken place, then 4 flip-flop circuits and 9 And circuits (or 9 NAND circuits and 9 inverter circuits) had been necessary. Thus, in general, if $2^{p-1} < n \leq 2^p$, the number of flip-flops must be $p$. Thus, for example, for $n$=15 there applies that $2^4$=16, hence 4 flip-flops are required. These 4 flip-flops remain necessary for $n$=9.

The number of AND or NAND plus inverter circuits must be equal to $n$.

It is then always necessary that the $n^{th}$ output of the counter 28 (which is an output 58 of the third inverter circuit 57 of FIG. 5) is connected to the input of flip-flop circuit $FF_5$, so that the signal at the terminal 47 ensures through this flip-flop that the $(n+1)^{th}$ transition (4th transition in the Example according to FIG. 5) is not counted. An input 59 of the flip-flop circuit $FF_5$ is connected to the input 38 so that also in this case the line synchronizing pulses derived from the converter 12 bring the flip-flop circuit $FF_5$ in its preconditioned state.

In a corresponding manner the field counter 30 and the gating circuit 29 must then be extended. As is now shown in FIG. 5, the field counter 30 must include two flip-flops circuits and in principle 3 AND (or 3 NAND plus 3 inverter circuits) if $n$=3. For this field counter there applies too that it must include $p$ flip-flop circuits if $n$ is between $2^{p-1} < n \leq 2^p$ and $n$ AND or $n$ NAND plus inverter circuits. The gating circuit must then have $n$ NAND gates.

As already stated a signal according to FIG. 8*b* originates from the output 7. This signal is converted in the flip-flop circuit $FF_1$ into a signal according to FIG. 8*c* occurring at the output 48. The line pulses at the input 46 of the flip-flop circuit $FF_1$ ensure a preconditioned state because their positive going edge (that is at the end of one line period) brings the flip-flop circuit $FF_1$ to its original state, independently of the occurrence, at the end of a line, of the broad pulses derived from the line-synchronizing pulses. Nothing happens if this flip-flop were not brought to a different state by a previous positive edge of a black-to-white transition. Thus, for example, FIG. 8*c* shows that during scanning of the line II, the first black-to-white transition occurring at the instant $t_1$ results in the flip flop circuit $FF_1$ being triggered, while the subsequent positive edge of the second black-to-white transition 2 results in the flip-flop circuit $FF_1$ returning to its normal state. Subsequently, the positive edge of the third black-to-white transition 3 again results in the flip-flop circuit $FF_1$ being triggered and this circuit only returns to its normal state by the subsequent positive going edge of the line-synchronizing pulse which is active at terminal 46 and which occurs after the third black-to-white transition 3 in line II.

The same happens in line III, the first black-to-white transition 1 and the second black-to-white transition 2 cause a pulse in the signal according to FIG. 8*c*. Also the positive going edge of the third black-to-white transition 3 in line III has the same result as in the line II but the fourth black-to-white transition 4 does not result in a return of the flip-flop circuit $FF_1$ due to the preconditioned state caused by the signal which is active at the input 47. Thus when scanning line III, the flip-flop circuit $FF_1$ also in this case does not return to its normal state until the end of the line III. This has been done to ensure that transition counter 28 only counts 3 black-to-white transitions, but it will be evident that it is very simple to count up to 4, 5 or more transitions by extending the transition counter 28 in the manner previously described.

After the foregoing it will be evident that when scanning the lines IV and IV, the same trigger process will take place as is described for the lines II and III. Since, as already stated, the signal at the output terminal 49′ is inverted relative to that at the terminal 48, the signal at the terminal 49′ has a shape as shown in FIG. 8*d*. This signal is now applied to the input terminal of the second flip-flop circuit $FF_2$ and since this flip-flop circuit also reacts every time to a positive going edge in the signal according to FIG. 8*d* a signal as shown in FIG. 8*e* is produced at the output terminal 52. In this connection it is to be noted that the line synchronizing signal at the preconditioning terminal 51 of the flip-flop circuit $FF_2$ ensures that this circuit returns to its normal state at the end of each line period. As a result the signal according to FIG. 8*e* will indeed be returned to its zero value at the end of the line V. For the flip-flop circuit $FF_2$ there applies also that the signal at the output terminal 53 is inverted relative to that at the terminal 52 so that the signal at the terminal 53 has a shape as shown in FIG. 8*f*.

An adding principle as shown in the Table below applies for a Nand circuit.

NAND

0+1=1
1+1=0
0+0=1

Since the NAND-circuit 49 receives the signals of FIGS. 8*c* and 8*e* at its two inputs, a signal as shown in FIG. 8*g* appears at the output 59′ of the inverter circuit 55. The signals according to FIGS. 8*d* and 8*e* are applied to the two inputs of the NAND-circuit 50 so that a signal according to FIG. 8*h* appears at the output 60 of the inverter circuit 56. Finally the signals according to FIGS. 8*c* and 8*f* are applied to the two inputs of the NAND-circuit 54 so that a signal according to FIG. 8*i* appears at the output 58 of the inverter circuit 57.

It is evident from FIG. 8*g* that the leading edges of this pulsatory signal occur at the instants $t_1$, $t_4$, $t_8$ and $t_{12}$ which are the first black-to-white transitions of the scanned lines. This means that a signal containing information regarding the first black-to-white transitions of each line appears at the output 59′ of the transition counter 28, which output succeeds the Nand circuit 49 and the inverter circuit 55.

It is similarly evident that the signal according to FIG. 8*h* has leading edges which only occur at the second black-to-white transitions of each line and appear at the second output 60 of the transition counter 28, and that the signal according to FIG. 8*i* has leading edges which only occur at the third black-to-white transitions of each line and appear at the output 58. These three outputs lead through the common lead 31 to three inputs of the gating circuit 29. These three inputs lead to 3 NAND-circuits 61, 62 and 63 to which likewise three pulsatory signals are applied from the field counter 30 through the lead 32. The latter pulsatory signals determine the duration of any one of the NAND-circuits 61, 62 and 63 passing the signal derived from the lead 31. Thus the signal at an output 64 of the field counter 30 ensures that the NAND-circuit 61 passes a signal every time during a first field period. The pulse from an output 65 ensures that the NAND-circuit 62 passes a signal during a second field period and finally the pulse from an output 66 ensures that the NAND-circuit 63 passes a signal exclusively during the third field period. Since the signals from the three outputs 58, 59′ and 60 of the transition counter 28 are combined with the pulses from the outputs 64, 65 and 66 of the field counter 30, a signal which exclusively contains the first black-to-white transitions of each line during a first field period appears at an output 67 of the NAND-circuit 61. During the second field period a signal which exclusively contains the second black-to-white transitions of each line appears at an output 68 of the NAND-circuit 62, and finally a signal which exclusively contains the third black-to-white transitions of each line appears during the third field period at an output 69 of the NAND-circuit 63. The three output signals from outputs 67, 68 and 69 are subsequently applied to a NOR-circuit 70, which passes either the signal from output 67 or the signal from 68, or the signal from 69. During the first field period the first black-to-white transitions of each line according to the signal of FIG. 8*g*, appear successively at an output 71 of the NOR-circuit 70, the second black-to-white transitions of each line according to the signal of FIG. 8*h* appear during a second field period, and the third black-to-white transitions of each line according to the signal of FIG. 8*i* appear during a third field period.

This process is repeated regularly because the output 2 of the camera 1 continuously supplies signals as long as the object 6 is in front of the camera 1, which signals provide every time signals during a first, second and third field period with the aid of the described process by means of transition counter 28 and field counter 30.

The field counter 30 functions in a substantially corresponding manner as the transition counter 28 which is in so far different in that the field synchronizing pulses applied to its input 43 are counted by this field counter and that a first flip-flop circuit $FF_3$ is not preconditioned as this was the case for the first flip-flop circuit $FF_1$ of the transition counter 28. Therefore it is possible to count also the fourth pulses with the field counter 30 so that pulses become available at an output 72 during a fourth field period, which pulses are also utilized in a manner to be described hereinafter for switching the gating circuit 29.

The field counter 30 includes not only the flip-flop circuit $FF_3$, but also a second flip-flop circuit $FF_4$ and four NAND-circuits 73, 74, 75 and 76 succeeded by four inverter circuits 77, 78, 79 and 80. Here too, these circuits have been used because NAND and inverter circuits were available as circuit blocks, but any combination of NAND and inverter circuits might just as well be replaced by an AND circuit. Only as regards the NAND-circuit 73 and the inverter circuit 77 must an exception be made. A field pulse appears at the output 72 at such a polarity that a NAND-circuit 81 in the gating circuit 29 is opened during a fourth field period so as to pass the signal from the output 41 of the threshold circuit 3. At the same time, however, a field pulse of opposite polarity (derived from the NAND-circuit 73) must become available at an output 82 of the field counter 30 which output blocks a NAND-circuit 83 in the gating circuit 29 during a fourth field period. Therefore NAND circuit 83 and a subsequent NAND-circuit 84 must be open during the first, second and third field periods when the signals originating from the NOR-circuit 70 must be passed on through a flip-flop circuit $FF_6$ to the NAND-circuit 84. The NAND-circuit 83 must be blocked during a fourth field period, so that a signal originating from the NAND-circuit 81 can be passed on during a fourth field period through the subsequent NAND-circuit 84 to a subsequent inverter circuit 85, which signal thus appears at the output 44.

In summary it can be stated that the signal according to FIG. 8*g* exclusively containing information regarding the first black-to-white transition of each line appears during a first field period at the output 44, the signal according to FIG. 8*h* exclusively containing information regarding the second black-to-white transition of each line appears during a second field period, the signal according to FIG. 8*i* containing information regarding the third black-to-white transition appears during the third field period, and that signals according to FIG. 11*a* and to be described hereinafter appear during a fourth field period.

The pulses appearing at the output 44 are applied to the sampler circuit 9 which is the same as the sampler circuit 9 of FIG. 1. This sampler circuit, too, receives through lead 11 a sawtooth signal of line frequency from the sawtooth generator 10, which signal is shown in FIG. 8*j*. The sawtooth generator 10 is synchronized in a similar manner as described with reference to FIG. 1 with the aid of line synchronizing pulses which become available at the input 40.

However, since pulses according to FIG. 8*g* are applied from the terminal 44 to the sampler circuit 9 during a first field period, this means that samples are taken in the circuit 9 exclusively during each first black-to-white transition of each line during each first field period. This is apparent from a comparison of FIGS. 8*g*, 8*j* and 8*k*, since the amplitude-varying output signal according to FIG. 8*k* only shows steps at the instants $t_1$, $t_4$, $t_8$ and $t_{12}$ which are determined every time by the occurrence of the first black-to-white transitions according to FIG. 8*g*, and the instantaneous value of the sawtooth signal according to FIG. 8*j*. If a second sampler circuit 86 succeeding the circuit 9 and to be described hereinafter is left out of consideration for a moment, the amplitude-varying signal according to FIG. 8*k* exclusively containing information regarding the first black-to-white transitions of each line appears at the output 45 of the converter 8 during each first field period.

By comparing the FIGS. 8*h*, 8*j* and 8*l* it can be proved in a similar manner that an amplitude-varying signal according to FIG. 8*l* appears at the output 45 during each second field period, which signal exclusively shows steps at the second black-to-white transitions of each line, which in FIG. 8*l* is shown at the instants $t_2$, $t_5$, $t_9$ and $t_{13}$. A signal according to FIG. 8*m* exclusively containing steps during the third black-to-white transitions of each line appears at the output 45 during each third field period as is shown in FIG. 8*m* for the instants $t_3$, $t_6$ and $t_{10}$. Since less strict requirements as regards the bandwidth are imposed upon both the cable 15 and the amplifiers 13 and 18 (FIG. 4) it can be stated that a signal to be displayed appears at the output of the amplifier 18 and in which signal the steps occurring in the signals according to FIGS. 8*k* , 8*l* and 8*m* have largely disappeared. This is actually the intension since, as it were, a continuous line as shown by the reference numeral 1 during the first field period of FIG. 7 is ultimately obtained in the signal to be displayed during a first field period. In connection with displaying exclusively the second black-to-white transition, a line as shown by the reference numeral 2 during the second field period of FIG. 7 is produced in a similar manner during a second field period, while for the third field period a signal is produced as is shown in Fig. 7 by the reference numeral 3. The signal occurring during a fourth field period and denoted by the reference numeral 4 in FIG. 8 will further be referred to hereinafter.

The result is that the signals occurring during the first, second and third field periods will write lines on the screen of the tube 19 which are shown in the FIGS. 6*a*, 6*b* and 6*c*. Since the screen of the tube 19 has a long persistence period, these three Figures are considered as one FIgure. By inserting the transition counter 28, the field counter 30 and the gating circuit 29 it is thus achieved that a full picture of the character to be transmitted is obtained on the screen of the tube 19, while yet a very small bandwidth of the transmission path comprising the amplifier 13, the cable 15 and the amplifier 18 may be sufficient. In addition less strict requirements are imposed on the display device 17, because unlike the system of FIG. 1, the display device 17 in the system of FIG. 4 need not be capable of following the steps in the signal as shown in FIG. 3*d*.

It is apparent from the foregoing that for the embodiment as described so far in FIG. 5 it is sufficient to have only three black-to-white transitions in each character. To complete a picture the last black-to-white transition which is formed by the line 4 in the example of FIG. 2 may alternatively be used. The more extensive system of FIG. 5 then functions in such a manner that it always takes the last black-to-white transition, which means that also part of the line 3 is taken along at the beginning and part of the line 2 is taken along at the end so that ultimately a line is written during a fourth field period as is shown in FIG. 6*d* and which as regards the signal is shown in FIG. 7 in a fourth field period by the signal 4. The manner in which this signal is obtained during a fourth field period will be described hereinafter.

The threshold circuit 3 includes not only a flip-flop circuit $FF_7$, which supplies at its output 7 the signals according to FIGS. 3*b* and 8*b*, but also successively an inverter circuit 88 and a NAND-circuit 89. In fact, the same signal as shown in FIG. 3*b* and FIG. 8*b* becomes available at the output 41 of the threshold circuit 3 and this signal is shown again in FIG. 11*a*. The inverter circuit 88 and the NAND-circuit 89 are only present because the NAND-circuit 89 must now only pass on a signal when the signal derived from the input 35 allows this. This signal is derived from a delay device 90 connected to the output 34 which forms part of the line converter 12. In fact, this line converter includes in series a flip-flop circuit $FF_8$ and an inverter circuit 92 to which a line control circuit 93 and the said delay device 90 are each connected and which provides a delay over a rather long part of one line period, which delay may vary between 47 and 55μsec. for a 625-line system. Furthermore the line converter includes a second delay device 94, which has only a delay period of 5μsec. and which exclusively serves for preconditioning the flip-flop circuit $FF_6$ in the gating circuit 29. The signal provided by the delay device 90 is shown in FIG. 11*c* so that only a part of the signal according to FIG. 11*a* is passed on by the NAND-circuit 89 during the period that it is opened by the signal according to FIG. 11*c*. This opening exists substantially throughout the scan period, for example, as is shown in FIG. 11 for scanning the line II during the period $\tau_s$ so that only during this period $\tau_s$ the video signal according to FIG. 11*a* is passed at the output 41 of the NAND-circuit 89. This signal therefore appears at an input of the NAND-circuit 81 at whose other input the field pulse from the output 72, of the field counter 30 appears which opens the NAND-circuit 81 during the fourth field period. This means that the video signal according to FIG. 11*a* appears at the output of the NAND-circuit 81 during each fourth field period, but it is then exclusively passed during a period $\tau_s$. During each fourth field period the same type of signal appears at the NAND-circuit 84 and therefore also at the output 44 after passing the invertor circuit 85.

Thus, a video signal appears during each fourth field at the input of the sampler circuit 9 over a period $\tau_s$ of each line including all black-to-white transitions which are determined by the character to be transmitted. The sawtooth signal of line frequency derived from the sawtooth generator 10 and shown in FIG. 11*b* is also again applied to the sampler circuit 9. Samples are taken again in a similar manner as described for the circuit of FIG. 1, during all black-to-white transitions so that a signal according to FIG. 11*d* is produced at the output of the sampler circuit 9. This signal is subsequently applied to an input 95 of the second sampler circuit 86, namely to that input to which the sawtooth signal from the generator 10 is applied in the sampler circuit 9. The instant when a sample must be taken in the sampler circuit 86 is determined by the pulsatory signal which is applied to the terminal 36 and which is derived from the output 34 connected to the delay device 90. Therefore the signal at the terminal 36 has a shape as is shown in FIG. 11 *c* and this signal thus takes samples from the signal according to FIG. 11*d* at the instants $t_{14}$, $t_{15}$, $t_{16}$ and $t_{17}$, A signal as shown in FIG. 11*e* appears during each fourth field period at the output 45. A comparison of the signals according to FIGS. 11*a* 11*d* and 11*e* shows that the varying amplitude of the signal according to FIG. 11*e* always corresponds to the level of the signal according to FIG. 11*d* at the last black-to-white transition of each line. Thus for the line II this is the level which occurs at the instant $t_3$ of the third transition, for the line III this is the transition which occurs at the instant $t_7$ of the fourth transition, for the line IV the fourth transition which occurs at the instant $t_{11}$ and for the line V the level of the second transition as occurs at the instant $t_{13}$. This signal varying in amplitude is also smoothed by the small bandwidth of the transmission path so that ultimately a signal as denoted by the reference numeral 4 in FIG. 7 is produced during the fourth field period. Hence a picture according to FIG. 6*d* is displayed on the screen of the display tube 19 during the fourth field period.

It will be evident from the foregoing that when the last transition would not have been the fourth but, for example, a fifth line, this fifth line would have been displayed during the fourth field period. Thus a portion of each character is deliberately omitted because the first three transitions and subsequently the last transition are always displayed. However, it has been found in practice that this does not detract from the usability of the system because several lines, especially when submitting signatures, do not contribute much to readability. On the contrary additional lines which often make matters inconvenient are deliberately omitted so that the rest becomes clearer rather than less clear.

Furthermore it is to be noted that the second sampler circuit 86 has been left outside consideration for the description of the first three transitions which result in signals during the first, second and third field periods. After the description of this sampler circuit it will be evident that the output signal for the first, second and third field periods of this sampler circuit does not experience any influence of the amplitude because the consideration should only include the fact that the second sampler circuit 86 takes a sample every time at the end of one line period. Since the signals according to FIGS. 8*k*, *l*, and *m* still assume a given value during the the scanning of one line and only change their value during the next line to be scanned, it does not matter at which moment of each line period the sample is taken. By addition of the sampler circuit 86 this sample is now taken for each line exactly at the end of one line period, so that for the sake of a correct consideration it should be taken into account that actually the ultimate value in the signals 8*k*, 8*l* and 8*m* is also taken at the instants $t_{14}$, $t_{15}$, $t_{16}$ and $t_{17}$. As a result a further bandwidth limitation of the transmission path is allowed. In fact, for the limitation which is given by the fieldwise transmission an additional limitation of the bandwidth of the transmission path is allowed because the information occurs at the fixed instants at the end of each line (64$\mu$sec. time difference) and is not spread over a line period (time difference varying between approximately 20 and 64$\mu$-sec.)

However, it is possible to handle the last transition and that of the *n* transitions previously counted separately from each other as has been done in the embodiment of FIG. 10. In FIG. 10 only the gating circuit 29 and the converter 8 are shown in a form which is modified relative to that of FIG. 5. The output of the NOR-circuit 70 leads to the flip-flop circuit $FF_6$ and from this circuit directly to the inverter circuit 85 whose output is connected to the sampler circuit 9 which functions in a similar manner as is shown in FIG. 5 and whose output 95 is connected to a NOR-circuit 96. During first, second and third field periods the NOR-circuit 96 passes a signal as is shown by the FIGS. 8 *k*, *l* and *m*, while for the fourth field period a signal is applied directly from the NAND-circuit 81 through a line 44′ to an added sampler circuit 9′ and is subsequently handled in the second sampler circuit 86 in a similar manner as has been described with reference to FIG. 5. During the fourth field the NOR-circuit 96 thus passes the signal of the second sampler circuit 86 so that this signal appears at the output 45. Consequently the circuit according to FIG. 10 functions in a similar manner as that according to FIG. 5, but the handling in the sampler circuits during the first, second and third field periods is separated from the handling of the last transition during the fourth field period.

As already stated, FIG. 9 shows a detailed circuit of the sampler circuit 9 which is otherwise equal to the circuit 86, and to the circuit 9′ for the case of FIG. 10.

The sawtooth signal originating from the source 10 appears at the lead 11 of the sampler circuit which signal is amplified in two transistors $T_1$ and $T_2$ arranged as emitter followers so that the sawtooth signal becomes available at the emitter electrode of the second transistor $T_2$. A pulsatory signal is applied to the input terminal 44 as has been described in the foregoing. In this respect it is to be noted that for the case of FIG. 1, terminal 44 and terminal 7 are identical while this is the terminal 44′ for the sampler circuit 9′ in FIG. 10. The pulsatory signal received at terminal 44 and terminal 7 or 44′ is applied to a monostable multivibrator 111 (mmv) which is triggered by the leading edge of the incoming signal and returns to its stable state after a short time, for example, 200 n.sec. A negative going short pulse which is applied to the base electrode of a third transistor $T_3$ is produced at the output of multivibrator 111. During the occurrence of this negative pulse the NPN-transistor $T_3$, which is normally bottomed, will be brought out of its bottomed state. Transistor $T_3$ and a fourth transistor $T_4$ form a so-called long tailed pair arrangement. In fact, if one transistor conveys more current, the other transistor conveys less and conversely, the sum remaining, however, constant and being determined by a transistor $T_5$ arranged in the tail and receiving a fixed bias voltage on its base by means of a potential divider 100–101 so that the collector current flowing therethrough has a constant value which is distributed over the transistors $T_3$ and $T_4$. Consequently, if the transistor $T_3$ is greatly conducting, transistor $T_4$ is cut off and a voltage drop occurs across a resistor 102 in the emitter and collector circuit of transistors $T_2$ and $T_3$, respectively, the point connected to the emitter electrode of the transistor $T_2$ being more positive than the point connected to the collector of the transistor $T_3$. Since the transistor $T_4$ is cut off in this normal condition no voltage drop occurs across a resistor 103 in the emitter and collector circuit of transistors $T_2$ and $T_4$, respectively and thus diodes 104, 105, 106 and 107 series-arranged between the collector electrodes of the transistors $T_3$ and $T_4$ are blocked and capacitors 108, 109 and 110 provided between the diode junctions and ground cannot receive charge. The capacitors 108 and 110 have comparatively small values and are approximately 27 pF in the embodiment according to FIG. 9, whereas the capacitor 109 coupled to the diodes 105 and 106 has a comparatively large value and is 270 pF, that is to say, 10 times greater than each of the comparators 108 and 110. All this has been done because the diodes are affected with parasitic capacitances. During the flyback of the sawtooth signal at the lead 11 this flyback might cause crosstalk through these parasitic capacitances to the output terminal 95 connected to capacitor 109. By using the parasitic capacitance of the diode 104 together with capacitor 108 and the capacitance of diode 107 together with capacitor 110 as a capacitive potential divider, this flyback is attenuated to such an extent that the remaining crosstalk through the parasitic capacitances of the diodes 105 and 106 to the output terminal 95 is negligible.

The charge across capacitor 109 substantially always assumes the value which is determined by the sawtooth signal at the emitter electrode of the transistor $T_2$ at the instant when the transistor $T_3$ is brought out of its saturated state by the negative pulse at its base. In fact, if this is the case, then transistor $T_3$ is cut off and transistor $T_4$ is so that a current starts to flow through resistor 103 and a voltage drop is produced across resistor 103 and hence diodes 104, 105, 106 and 107 are released. As a result the capacitors 108, 109, 110 assume a charge which is determined by the voltage prevailing at that instant at the emitter electrode of transistor $T_2$. If transistor $T_3$ is saturated again, which is ensured by the negative pulse active on its base and having a duration of only 220 n.sec, then the diodes 104 to 107 inclusive are blocked again and the charge remains stored in the capacitor 109 so that this capacitor functions as the memory. The output signal may be derived from the terminal 95 and applied to the second sampler circuit 86 in the case of FIG. 5 or to the NOR-circuit 96 in the case of FIG. 10. The resistors 102 and 103 have a small value and are only 110 Ohms so that the charge period for the capacitors 108, 109 and 110 has been maintained extremely short. The said 200 n.sec of the signal on the base of the transistor T3 are therefore long enough to ensure that the said capacitors receive a charge which corresponds to the voltage at the emitter electrode of the transistor $T_2$ at the instant of the transistor $T_3$ being brought out of its saturated state.

Also the sampler circuit 86 is formed in the manner as shown in FIG. 9, but in this case the signal according to FIG. 11*c* is applied to the multivibrator 111 and the signal according to FIG. 11*d* is applied to the terminal 11. Otherwise the circuit 86 functions in the same manner as the circuits 9 and 9'.

The sampler circuit according to FIG. 9 has only been given by way of example and it will be evident that other configurations are possible for such a circuit.

It is further to be noted that the system according to the invention is, suitable for example, for automatic money transfer by telephone when so-called videophone system will become available. It is true that then the advantage of the bandwidth limitation as described for the system of FIG. 4 is not provided because processing must be effected in the post office or in the bank because the videophone only transmits the picture of the subscriber to the relevant building, but then one has the advantage of uncomplicated system equipment according to FIG. 1 and in addition simple display equipment.

Finally it is to be noted that the representation in FIG. 7 is actually not quite correct. As described hereinbefore the bandwidth of the transmission path is limited, but this means that the steps at the end and at the beginning of each field period, as shown in FIG. 7, do not have such a steep course as is shown. It follows that the step of the electron beam will not be effected infinitely quickly so that the phosphor on the screen of the cathode-ray tube 19 can be excited resulting in lines becoming visible on the screen. This is undesirable. To avoid this device 17 includes beam suppression means which are shown in FIG. 12 and in which Figure corresponding parts have the same reference numerals as those in FIG. 4, but wherein the switches S1 and S2 have been omitted for the sake of simplicity. The signal from the wire 16 goes, for example, through the converter 18' to the same input of display device 17 as the signal originating from switch *s*11 of FIG. 4. The signal originating from the output terminal of amplifier 18 goes on the one hand through a lead 115 to the same input of display device 17 as the signal originating from switch *s*12 of FIG. 4 and on the other hand to a differentiating network comprising a capacitor 116 and a resistor 117. This network differentiates the signal according to FIG. 7. If great steps occur at the beginning and the end of a field period (or possibly in the signal itself when a sudden stop from one line to another in the character to be transmitted occurs) then a pulsatory signal 118 is produced which as a function of the direction of the step (positive or negative going) may comprise positive and negative pulses. The positive pulse is passed by a diode 119, the negative step is passed by a diode 120. However, small steps in the signal (which must be displayed if desired) are prevented from passing, to which end diode 119 is positively biassed by means of a direct voltage source 121 and the diode 120 is negatively biassed by means of the direct voltage source 122. Therefore the diodes 119 and 120 will first pass pulses when their amplitudes have exceeded a given value determined by the sources 121 and 122, which means that the slope of the steps in the signal according to FIG. 7 must have a certain value if positive and negative pulses are to become active at base electrodes of transistors $T_6$ and T $T_7$ coupled to the diodes 119 and 120, respectively. The diodes 119 and 120 combined with the sources 121 and 122 are therefore to be considered as a threshold device which only passes pulses having an amplitude above a given value.

The transistors $T_6$ and $T_7$ are arranged in longtailed pair arrangement including in their tail a transistor $T_8$ adjusted at a fixed value. When no pulses are applied to their base electrodes, the two transistors convey the same current.

If a positive pulse appears at the base of transistor $T_6$ then this transistor starts to convey temporarily more current so that a negative going pulse occurs across a collector resistor 123. This pulse may be applied through a lead 124 to a further input of the device 17 and it may ensure by means of the Wehnelt cylinder of the tube 19 that the beam current is suppressed during the occurrence of steps having a great steepness in the signal according to FIG. 7.

If a negative pulse occurs at the base of transistor $T_7$, then this transistor starts to convey temporarily less current and hence transistor $T_6$ conveys more current. Then, too, a negative pulse is produced across collector resistor 123. This ensures through the lead 124 that the beam current is suppressed in case of the step having a great steepness and decreasing slope in the signal of FIG. 7.

It will also be evident that when positive suppression pulses must be derived from the lead 124 in connection with the construction of the device 17, these pulses may be derived from the collector of the transistor $T_7$.

What is claimed is:

1. A transmitter for the transmission of an object image comprising a television camera disposed to view said object and having a video signal output, a line sweep generator coupled to said camera and to a digital to analog converter, a field sweep generator coupled to said camera, means for converting said video signal into pulse signals representing black-to-white transistions including a threshold circuit coupled to said output, means for converting said pulse signals into a sampled amplitude varying signal comprising said digital to analogue converter coupled to said threshold circuit, said converter comprising a sampling circuit for sampling the value of the signal from said line sweep generator when a pulse signal occurs and means for transmitting said amplitude varying and field sweep signals.

2. A transmitter as claimed in claim 1 further comprising a field counter having an input coupled to said field sweep generator and *n* plurality of output means for providing field pulses at each of said $n^{th}$ output means during the $n^{th}$ field period respectively; a transition counter means having a first input coupled to said threshold circuit, a second input coupled to said line generator, *n* plurality of output means for providing pulses representing the $n^{th}$ black to white transition of each of the scanning lines at an $n^{th}$ output respectively; and feedback means coupled to the last of said transition counter output means for preventing said transition counter from counting the $(n+1)^{th}$ transition of each line; and a gating circuit having a first plurality of *n* inputs coupled to said transition counter *n* outputs respectively, a second plurality of *n* enabling inputs coupled to said field counter outputs respectively, and an output means coupled to said digital to analogue converter for providing pulses representing the $n^{th}$ black to white transistion of each scanning line during the $n^{th}$ field period.

3. A transmitter as claimed in claim 2 wherein said field counter further comprises a NAND gate means for supplying a field pulse; said gating circuit further comprising a NAND gate means coupled to said field counter NAND gate and said threshold circuit for passing the pulse video signal during the $(n+1)$field; and said digital to analogue converter comprises a pair of serially coupled sampling circuits, said first sampler taking samples of all transistions during each line, said second sampler circuit taking samples at the end of each line; whereby the last transistion of each line is transmitted.

4. A transmitter as claimed in claim 2 wherein said digital to analogue converter comprises a sampling circuit having a memory means for storing the value of said sawtooth signal when a pulse signal occurs and means for erasing said memory at the end of a line period.

5. A transmitter as claimed in claim 4 wherein said memory comprises a capacitor.

6. A receiver comprising means for generating a sawtooth signal having an input means for receiving a transmitted sweep signal for synchronization thereof; and a display means having a first deflection means coupled to said generating means and a second transverse deflection means, means to apply a transmitted signal having a varying amplitude representing black-to-white transistions of an object image to said second transverse deflection means.

7. A receiver as claimed in claim 6 further comprising means coupled to receive said amplitude varying signal and coupled to said first deflection means for suppressing the display means image upon the occurrence of a slope in said signal above a selected value.

8. A receiver as claimed in claim 7 wherein said suppressing means comprises a differentiator coupled to receive said amplitude varying signal; a threshold means having a pair of outputs for passing pulses above and below respective levels respectively; a pair of emitter coupled transistors each having a base coupled to said outputs respectively, a collector of one of said transistors being coupled to said first deflection means.

9. A receiver as claimed in claim 6 further comprising memory means coupled to receive said amplitude varying and sweep signals and coupled to said deflection means.

10. A system for the transmission of an object image comprising a transmitter and a receiver coupled to receive signals from said transmitter; said transmitter comprising a television camera disposed to view said object and having video signal output, a line sweep generator coupled to said camera, a field sweep generator coupled to said camera, means for converting said video signal into pulse signals representing black-to-white transistions including a threshold circuit coupled to said output, means for converting said pulse signals into a sampled amplitude varying signal comprising a digital to analogue converter coupled to said threshold circuit, and means for transmitting said amplitude varying and field sweep signals to said receiver; said receiver comprising means for generating a sawtooth signal having an input coupled to receive said sweep signals for synchronization thereof, display means having a first deflection means coupled to receive said sweep signal and a second transverse deflection means coupled to receive said amplitude varying signal.

* * * * *